United States Patent Office

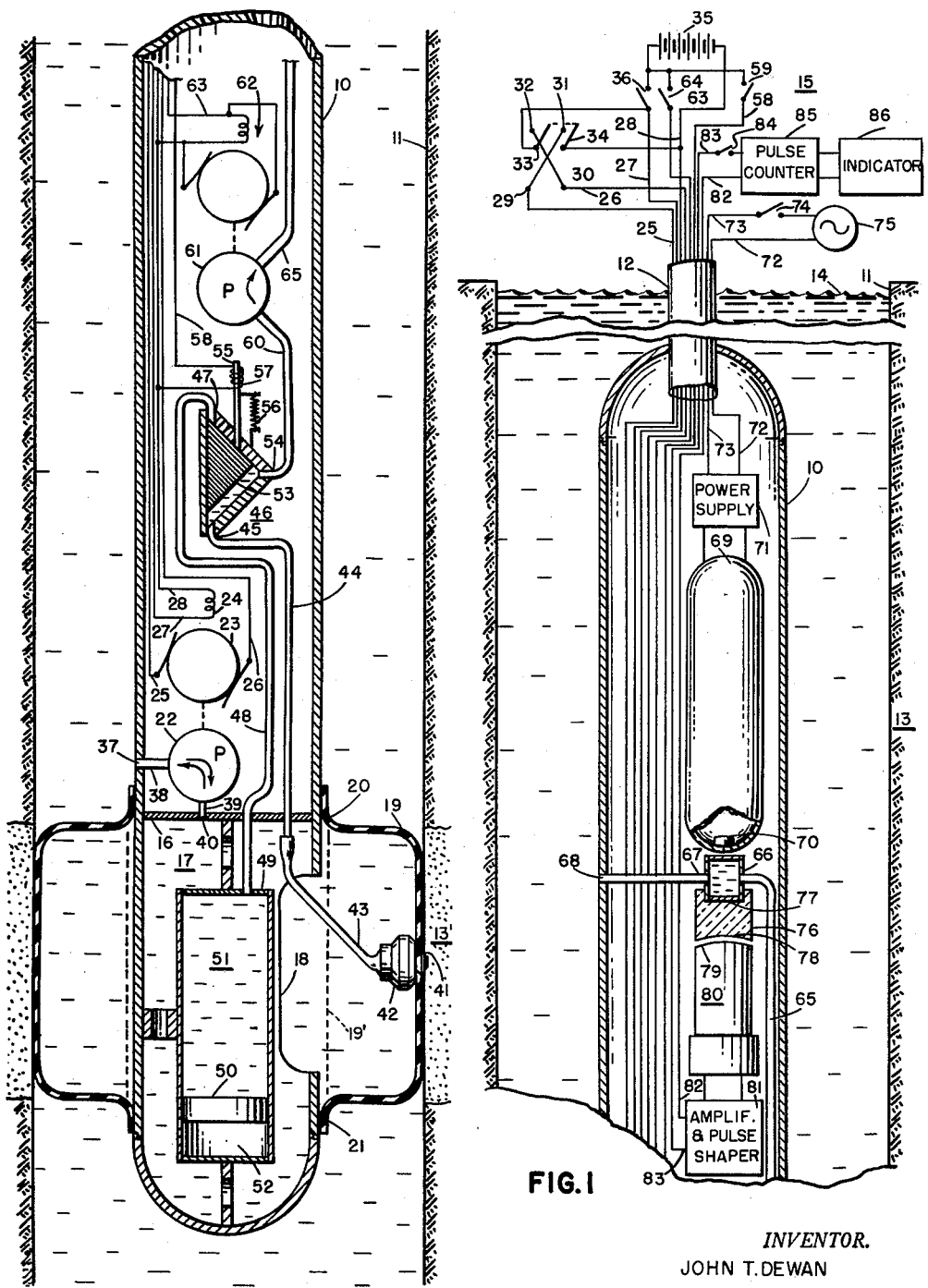

2,926,259
Patented Feb. 23, 1960

2,926,259

METHOD AND APPARATUS FOR ANALYZING EARTH FORMATIONS

John T. Dewan, Houston, Tex., assignor, by mesne assignments, to Schlumberger Well Surveying Corporation, Houston, Tex., a corporation of Texas Application September 23, 1953, Serial No. 381,856

10 Claims. (Cl. 250—71)

The present invention relates to methods and apparatus for analyzing the fluid content of permeable formations traversed by a borehole, and more particularly, to new and improved nuclear methods and apparatus for determining the percentage of hydrocarbon in such fluid.

It has become accepted oil field practice to make so-called radioactivity logs of the earth formations traversed by a borehole. By means of conventional neutron logs it is possible, in general, to determine whether or not a given formation contains hydrogenous fluid, but not to distinguish between hydrocarbons (oil or gas) and water, much less the percentage of each. By improved neutron logging methods, such as disclosed in Goodman application Serial No. 275,932, filed March 11, 1952, and assigned to the same assignee as is the present invention, for "Neutron Well Logging," it is possible to determine the relative percentages of oil or gas and water in the fluid content of permeable formations by employing a source of high intensity mono-energetic neutrons in the borehole. However, due to the abundance of hydrogenous material in the water base or oil base liquid filling the borehole, such percentages are only approximate, and the necessity for a high intensity neutron flux complicates the logging apparatus.

It is an object of the present invention, accordingly, to provide new and improved methods and apparatus for analyzing earth formations traversed by a borehole.

Another object of the present invention is to provide improved methods and apparatus for analyzing formations at their levels along a borehole to obtain direct information concerning the composition of fluids contained by such formations.

In accordance with the present invention, earth formations traversed by a borehole are analyzed by obtaining a sample of fluid from a formation of interest at a preselected depth in the borehole. The sample is then irradiated with radiant energy while substantially at the preselected depth and a characteristic of the resulting radiant energy emanating from the sample is indicated.

Formation analyzing apparatus according to the present invention comprises a sample chamber adapted to pass through a borehole. The sample chamber is positionable in the vicinity of a formation of interest and means are provided for completing a fluid connection between the sidewall of the borehole adjacent the formation of interest and the sample chamber. Thus, a fluid sample may be admitted into the sample chamber. The apparatus further includes a source of radiant energy adapted to pass through the borehole with the sample chamber for irradiating the fluid sample with radiant energy. Means are provided for indicating a characteristic of the resulting radiant energy emanating from the fluid sample.

The novel features of the present invention are set forth with particularity in the appended claims. The present invention itself, both as to its organization and manner of operation, together with further objects and advantages thereof may best be understood by reference to the following description taken in connection with the accompanying drawing in which:

Fig. 1 is a view, partly in longitudinal cross section, of the upper portion of a formation analyzer embodying the present invention, shown together with surface equipment; and Fig. 1A is a view of the lower portion of the formation analyzer shown in longitudinal cross section.

As shown in Fig. 1 of the drawing, the formation analyzer constructed in accordance with the present invention comprises a support in the form of a hollow, pressure-tight housing 10 suspended within a borehole 11 by a cable 12. The borehole 11 traverses earth formations 13 and may be filled with a drilling fluid 14.

Cable 12 is provided with a plurality of electrical conductors that are electrically insulated from one another. These conductors serve to complete electrical connections between apparatus within housing 10 and surface equipment 15. The cable preferably is of the armored type and thus may be used in association with a motor-driven winch (not shown) for lowering and raising housing 10 in borehole 11. Accordingly, housing 10 may be lowered in the borehole to a preselected depth in which the lower extremity of its lower portion, shown in Fig. 1A, is adjacent a formation of interest 13'.

A sealed partition 16 closes a portion of housing 10, to form a lower chamber 17. A longitudinally-extending opening 18 fluidly communicates chamber 17 of the housing with the interior of an annular, flexible packer 19. The upper and lower ends 20 and 21, respectively, of the packer are cemented or otherwise secured to the outer surface of housing 10 in a manner forming pressure-tight connections. The packer 19 may be constructed of rubber and is arranged to have a normal un-extended position, flat upon the outer surface of the housing, as shown by dash lines 19'.

The packer 19 is adapted to be expanded as a result of pressure exerted by a reversible pump 22 driven by an electric motor comprised of an armature 23 and a field winding 24. The direction in which motor 23, 24 rotates is determined by the relative polarities of the energizing potentials applied to its armature over leads 25, 26 and to its field over leads 27, 28.

As shown in Fig. 1, armature leads 25, 26 are connected to fixed contacts 29, 30 and 31, 32 of a current-reversing switch of surface equipment 15. This switch includes a pair of simultaneously-movable contactors or arms 33, 34. Arm 34 and field lead 28 are connected to one terminal of a source of electrical energy, such as a battery 35. The remaining terminal of the battery is connected via switch 36 to field lead 27 and to arm 33 of the reversing switch.

With reversing switch 29—34 in one of its two positions and switch 36 closed, motor 23, 24 drives pump 22 in a given direction and drilling fluid 14 is drawn into the pump via a port 37 in housing 10 and a pipe 38. The fluid is expelled from the pump over a pipe 39 and a port 40 in partition 16 into chamber 17. Thus, a differential pressure may be created between the inside of packer 19 and the fluid in borehole 11 which is sufficiently great to expand the packer into engagement with the sidewall of the borehole adjacent the formation of interest 13', as shown in Fig. 1A. If it is desired to equalize the pressure above and below packer 19, a conduit (not shown) may be provided to communicate the borehole liquid above and below the packer.

The wall of packer 19, between the upper and lower extremities thereof, is provided with a port 41 to which a fluid inlet 42 is connected. A flexible tube 43 is connected to fluid inlet 42 through which a fluid sample from formation 13' may flow.

The specific details of the packer and its actuating mechanism are not considered to be a part of the present invention. Consequently, a further description thereof is deemed unnecessary. The particular form of packer just described is of the type disclosed in Patent 2,441,894 which issued to Maurice Mennecier on May 18, 1948.

Generally stated, packer or pack-off means 19 is provided with an outer face adapted to fit the contour of the sidewall of the borehole 11 and thereby form a fluid seal between the sidewall and fluid 14 of the borehole. Motors 23, 24 and pump 22, together with the associated ports and conduits, constitute the means for forcing the face of the packer into engagement with the sidewall.

Obviously, a shoe-type packer may be substituted for the annular one illustrated. The shoe may be provided with a suitable flexible face and may be mechanically coupled to an actuating mechanism for forcing its face into engagement with the sidewall of the borehole. The housing 10 may be arranged to be forced against the opposite portion of the sidewall, or an actuated back-up shoe may be provided for this purpose.

Formation fluid in tube 43 may be drawn through a pipe or conduit 44 that is connected to an inlet port 45 of a slide-type distribution valve 46. Valve 46 includes another inlet port 47 connected by a pipe 48 to a tank or reservoir 49 positioned in chamber 17. A movable piston 50 divides the reservoir into an upper compartment 51 filled with a reference liquid, such as pure water, and a lower compartment 52 filled with a gas, such as air, preferably under a slight pressure to facilitate removal of the reference liquid.

Valve 46 is further provided with a valve piston 53, the operation of which selectively completes a fluid connection between one of inlet ports 45, 47 and an outlet port 54. An operating rod 55 is connected to piston 53 and a compression spring 56 biases the rod and the actuating member into the position shown. Accordingly, a fluid connection is normally maintained between ports 45 and 54.

To alter this fluid connection, the end of rod 55 is constructed of a magnetic material and is received by a solenoid 57 having one of its terminals connected to lead 28 and the other connected by a lead 58 to a switch 59 in surface equipment 15. The switch, in turn, is connected to battery 35 so that when the switch is closed, coil 57 is energized and the bias of spring 56 is overcome. Thus, a fluid connection may be selectively completed between inlet port 47 and outlet port 54 for a purpose to be more apparent from the discussion to follow.

Outlet port 54 of valve 46 is connected by a pipe 60 to a pump 61 arranged to be driven by an electric motor 62. One terminal of the motor is connected to common lead 28 and its other terminal is connected by a lead 63 to a switch 64 of surface equipment 15. The switch, in turn, is connected to battery 35.

When switch 64 is closed, motor 62 drives pump 61 and a fluid sample is drawn from the formation 13' and is supplied over a pipe 65 to a sample-receiving chamber 66 (Fig. 1). The walls of chamber 66 may be constructed of a material that is pervious to radiant energy, such as neutrons. For example, it may be constructed of aluminum. Fluid is forced from the chamber 66 via a pipe 67 and a port 68 in housing 10 into the borehole. In order that a fluid sample may be retained in chamber 66, pump 61 preferably is of the type which when not driven, prevents the flow of fluid between conduits 65 and 67.

The fluid contained by sample chamber 66 usually is a mixture of water and oil in a proportion dependent upon the amount of oil in the formation of interest. To analyze the sample and determine the relative amounts of these fluids, the apparatus embodying the present invention further includes a source of radiant energy in the form of a tube 69 enclosing an accelerator (not shown) of particles, such as ions, and a target 70. The target is composed of a substance which reacts with incident ions to produce neutrons. For example, a tritium target may be employed. The details of the source of radiant energy constitute no part of the present invention, and hence a detailed description is unnecessary. One source of radiant energy which may be employed for the purposes of the instant invention is disclosed in the copending application of J. T. Dewan, filed April 9, 1952, bearing the Serial Number 281,378, and assigned to the same assignee as is the present invention. Alternatively, a radiant energy source such as disclosed in the earlier-mentioned Goodman application may be utilized.

Source 69, 70 is supplied with the necessary operating potentials by a conventional high voltage power supply 71 connected by leads 72, 73 and via an operating switch 74 to a source 75 of alternating potential included in surface equipment 15. It is assumed that the generation of radiant energy, such as neutrons, by source 69, 70 may be initiated merely by closing switch 74 and that by opening the switch, operation ceases. Of course, a more complex switching arrangement may be necessary, however, for the sake of simplicity of representation, the details of the control system for energizing the radiation source have been omitted.

The neutrons emitted by target 70 preferably have an energy of the order of 14 million electron volts (m.e.v.) and react with oxygen of atomic weight 16 in the sample to produce oxygen of atomic weight 17. The latter isotope of oxygen, in turn, gives off a proton and becomes nitrogen of atomic weight 16. This isotope of nitrogen has a half life of 7.5 seconds and emits a 6.2 m.e.v. gamma ray and a beta particle to become oxygen of atomic weight 16. Thus, due to irradiation with neutrons, a resulting radiant energy is emanated from the sample.

To detect the resulting gamma radiation, the apparatus includes an energy-converting or scintillation element 76. Element 76 may be comprised of sodium iodide adapted to convert gamma radiation into light energy and is provided with an opening or recess 77 that receives sample chamber 66. The side 78 of element 76 opposite its recess is optically coupled to the light-admitting window 79 of a photoelectric device 80, preferably of the electron-multiplying type. Device 80 is responsive to light energy from scintillation element 76 and derives corresponding electrical energy, usually of pulse wave form.

Obviously, other radiation detectors may be substituted for detector 76, 80. For example, a Geiger tube may be employed.

The output of the detector is supplied to a conventional amplifier and pulse-shaper stage 81 connected by leads 82 and 83 and a switch 84 to a pulse counter or integrator 85 in surface equipment 15. The counter, in turn, is coupled to an indicator 86 which may be a recording voltmeter.

In operation, housing 10 is lowered in borehole 11 by means of cable 12 to a point adjacent formation 13'. Thereafter, and with reversing switch 29—34 in one of its two operative positions providing rotation of motor 23, 24 to drive the pump 22 so as to inflate packer 19, switch 36 is closed. Thus, a differential pressure is created which forces the face of the packer into engagement with the sidewall of borehole 11, thereby sealing a portion of the sidewall with respect to the interior of the borehole. Motor 23, 24 may be permitted to run continuously so as to maintain the differential pressure on the packer.

Thus, a fluid connection is established between a point in the sealed portion of the sidewall of the borehole and sample chamber 66 over inlet 42, pipes 43, 44, valve ports 45, 54, pipe 60, pump 61 and pipe 65.

Switch 64 then is closed thereby energizing motor 62 which drives pump 61 and a fluid sample is admitted to the sample chamber 66. Pump 61 is run until a sufficient amount of fluid sample is expelled from the sample chamber over pipe 67 and port 68 to assure the presence of a representative sample in the chamber. This action is halted by opening switch 64.

Switch 74 then is closed to energize source 69, 70 and the fluid sample in chamber 66 is irradiated with neutrons. This activation of the sample is carried on during a time interval of preselected duration. For example, 20 seconds after switch 74 is closed, it is opened and irradiation of the sample ceases.

As explained earlier, the incident neutrons on the fluid sample react with oxygen to produce an isotope of nitrogen having a relatively short half life (7.5 seconds). This isotope, in becoming stable oxygen, emits a beta particle and a gamma ray. Such radiant energy may be said to be induced by the incident neutrons. Gamma radiation from the sample in chamber 66 is converted to electrical pulses by detector 76, 80 which are supplied to surface equipment 15 after amplification and shaping in stage 81.

Immediately following the first-mentioned time interval, switch 84 is closed. Thus, counting of these electrical pulses, representing delayed gamma ray activity, is initiated in counter 85 and is performed during a time interval of preselected duration and subsequent to the first-mentioned time interval. For example, a counting time of three seconds may be employed.

Output device 86 indicates the number of pulses counted during the counting interval. Since these pulses are representative of the induced radiation, a characteristic of the resulting radiant energy emanating from the fluid sample in chamber 66 is indicated.

The data so obtained may be correlated with previously-obtained reference information. If it is desired to obtain a new reference, switch 59 is closed, thereby energizing solenoid 57, and piston 53 of distribution valve 46 is displaced to a position wherein a fluid connection is completed between inlet port 47 and outlet port 54. Thereafter, switch 64 is closed to energize motor 62 and pump 61 draws a sample of reference fluid (pure water) from reservoir 49 and forces it into sample chamber 66, while expelling the sample of information fluid over pipe 67 and port 68.

After obtaining a reference sample, switch 64 is opened and the procedure described above for irradiating the sample by closing switch 74 for a selected interval of time and for counting pulses representing induced radiant energy by closing switch 84 for a selected time interval is carried out. Hence, an indication is derived at output device 86 which represents a fluid sample in which the water content is 100%.

Since oil contains no oxygen in compound, the relative proportions of water and oil in the formation fluid sample may be determined by comparing the reference indication with the indication found for a sample of formation fluid.

After a reference indication is obtained, switch 59 may be opened and, if desired, another sample of fluid from formation 13' may be drawn into the sample chamber for analysis as the reference sample is expelled.

In order to obtain a sample of the fluid in another formation, reversing switch 29—34 is operated to reverse the direction of rotation in motor 23, 24 and pump 22 is reversed. Thus, a reverse differential pressure is created on packer 19 and it returns to its normal, unextended position 19' after which switch 36 is opened and reversing switch 29—34 is returned to its initial condition.

Housing 10 may then be positioned opposite another formation of interest by means of cable 12. Thereafter, switch 36 is closed and packer 19 is extended, and a complete cycle of operation may be performed in the manner described hereinbefore.

Obviously, any number of formations may be sampled in a single run of housing 10 in borehole 11. Therefore, the apparatus embodying the present invention does not require extensive idle time for expensive drilling crews.

Moreover, the apparatus may be relatively compact so as to meet the space limitations imposed on apparatus designed for borehole use.

Inasmuch as the analysis is based on oxygen content of the fluid sample, indications obtained with the apparatus embodying the invention are directly indicative of the chemical composition of the sample. Such indications, of course, are advantageous in determining the presence or absence of oil in a formation of interest as well as the reservoir capacity of the formation.

In addition, since the fluid sample under investigation is in close proximity to the neutron source, a relatively low neutron flux is required. This also permits a shorter irradiation time than might otherwise be required if the source were at a greater distance from the sample.

If desired, means may be provided for shielding sample-receiving chamber 66 from gamma radiation emanating from the borehole fluid 14. For example, an inner or outer layer of boron carbide and/or lead may be supported by housing 10 in the vicinity of the sample chamber.

In addition to the apparatus illustrated, housing 10 may be accompanied by other electrical logging equipment as it traverses a borehole. For example, a suitable electrode array for measuring electrical resistivity and/or spontaneous potential may be provided in a well known manner.

As used herein, the term "radiant energy" is intended to denote either wave or particle energy. Accordingly, gamma rays, neutrons and charged particlels are all deemed to be within the scope of the expression "radiant energy."

Moreover, "induced radiant energy" or "resulting radiant energy" are intended to signify radiant energy emanating from a material in response to incident radiant energy. Such phenomena as the generation of gamma rays by the material as a result of bombardment by and the capture of incident neutrons, and the production of slowed or lower energy neutrons caused by the elastic collisions of incident neutrons with particles of the material are considered to be exemplary of the last-quoted expressions.

While a particular embodiment of the present invention has been shown and described, it is apparent that changes and modifications may be made without departing from this invention in its broader aspects, and therefore the aim in the appended claims is to cover all such changes and modifications as fall within the true spirit and scope of this invention.

I claim:

1. A method of testing earth formations traversed by a borehole which comprises the steps of: positioning a sample chamber in a borehole in the vicinity of a formation of interest; sealing at least a portion of the sidewall of said borehole opposite said formation of interest with respect to the interior of said borehole; establishing a fluid connection between a point within said portion of said sidewall of said borehole and said sample chamber to admit a fluid sample from said formation of interest into said sample chamber; irradiating said fluid sample with radiant energy; and indicating a characteristic of the resulting radiant energy emanating from said fluid sample.

2. A method of testing earth formations traversed by a borehole which comprises the steps of: positioning a sample chamber in a borehole in the vicinity of a formation of interest; admitting a fluid sample from said formation of interest into said sample chamber; irradiating said fluid sample with radiant energy during a first time interval of preselected duration; and indicating a characteristic of the resulting radiant energy emanating from said fluid sample during a second time interval of preselected duration and subsequent to said first time interval.

3. Apparatus for testing earth formations traversed by a borehole comprising: a sample chamber adapted to pass through said borehole and positionable in the vicinity of a formation of interest; means for completing a fluid connection between the sidewall of said borehole adjacent said formation of interest and said sample chamber to admit a fluid sample into said sample chamber; a source of radiant energy adapted to pass through said borehole with said sample chamber for irradiating said fluid sample with radiant energy; and means for indicating a characteristic of the resulting radiant energy emanating from said fluid sample.

4. Apparatus for testing earth formations traversed by a borehole comprising: a support adapted to pass through said borehole and positionable in the vicinity of a formation of interest; a sample-receiving chamber included in said support; pack-off means including a face adapted to fit the contour of the wall of said borehole and having a port adapted to be fluidly connected with said sample-receiving chamber; means for forcing the face of said pack-off means against the sidewall of said borehole whereby a fluid sample from said formation of interest may be admitted into said sample-receiving chamber; a source of radiant energy mounted to said support for irradiating said fluid sample with radiant energy; and means for indicating a characteristic of the resulting radiant energy emanating from said fluid sample.

5. Apparatus for testing earth formations traversed by a borehole comprising: a hollow, substantially fluid-tight support adapted to pass through said borehole and positionable in the vicinity of a formation of interest; a sample chamber included within said support; means for completing a fluid connection between the sidewall of said borehole adjacent said formation of interest and said sample chamber to admit a fluid sample into said sample chamber; a particle accelerator included within said support and adapted to derive radiant energy for irradiating said fluid sample with radiant energy; and means for indicating a characteristic of the resulting radiant energy emanating from said fluid sample.

6. Apparatus for testing earth formations traversed by a borehole comprising: a sample chamber adapted to pass through said borehole and positionable in the vicinity of a formation of interest; means for completing a fluid connection between the sidewall of said borehole adjacent said formation of interest and said sample chamber to admit a fluid sample into said sample chamber; a source of radiant energy adapted to pass through said borehole with said sample chamber for irradiating said fluid sample with radiant energy; an energy-converting element having an opening receiving said sample chamber at least in part and adapted to convert into light energy radiant energy emanating from said fluid sample as a result of the irradiation thereof by radiant energy from said source; photoelectric means responsive to said light energy from said energy-converting element for deriving corresponding electrical energy; and indicator means responsive to said electrical energy.

7. Apparatus for testing earth formations traversed by a borehole comprising: a sample chamber adapted to pass through said borehole and positionable in the vicinity of a formation of interest; means for completing a fluid connection between the sidewall of said borehole adjacent said formation of interest and said sample chamber to admit a fluid sample into said sample chamber; a source of neutrons adapted to pass through said borehole with said sample chamber for irradiating said fluid sample with neutrons; and means for indicating a characteristic of the resulting gamma radiation emanating from said fluid sample.

8. Apparatus for testing earth formations traversed by a borehole comprising: a sample chamber adapted to pass through said borehole and positionable in the vicinity of a formation of interest; means for completing a fluid connection between the sidewall of said borehole adjacent said formation of interest and said sample chamber to admit a fluid sample into said sample chamber; a source of neutrons having an energy of the order of 14 million electron volts adapted to pass through said borehole with said sample chamber for irradiating said fluid sample with neutrons; and means for indicating a characteristic of the resulting gamma radiation having an energy of the order of 6.2 million electron volts emanating from said fluid sample.

9. Apparatus for testing earth formations traversed by a borehole comprising: a sample chamber adapted to pass through said borehole and positionable in the vicinity of a formation of interest; means for completing a fluid connection between the sidewall of said borehole adjacent said formation of interest and said sample chamber to admit a fluid sample into said sample chamber; a controllable source of radiant energy adapted to pass through said borehole with said sample chamber and adapted to irradiate said fluid sample with radiant energy during a first time interval of preselected duration; and controllable means for indicating a characteristic of the resulting radiant energy emanating from said fluid sample during a second time interval of preselected duration subsequent to said first time interval.

10. Apparatus for testing earth formations traversed by a borehole comprising: a sample chamber adapted to pass through said borehole and positionable in the vicinity of a formation of interest; means for completing a fluid connection between the sidewall of said borehole adjacent said formation of interest; means providing a source of reference fluid; means for selectively supplying fluid from the formation of interest and from said source of reference liquid to said sample chamber; a source of radiant energy adapted to pass through said borehole with said sample chamber for irradiating fluid in said sample chamber with radiant energy; and means for indicating a characteristic of the resulting radiant energy emanating from the fluid in said sample chamber.

References Cited in the file of this patent

UNITED STATES PATENTS

| | | |
|---|---|---|
| 2,437,935 | Brunner et al. | Mar. 16, 1948 |
| 2,567,057 | Crumrine | Sept. 4, 1951 |
| 2,648,012 | Scherbatskoy | Aug. 4, 1953 |
| 2,652,496 | Herzog | Sept. 15, 1953 |
| 2,658,284 | Arps | Nov. 10, 1953 |
| 2,689,918 | Youmans | Sept. 21, 1954 |
| 2,744,199 | Juterbock et al. | May 1, 1956 |